(12) United States Patent
Dolmatov et al.

(10) Patent No.: US 9,745,197 B2
(45) Date of Patent: Aug. 29, 2017

(54) DETONATION NANODIAMOND MATERIAL PURIFICATION METHOD AND PRODUCT THEREOF

(75) Inventors: Valery Dolmatov, Vantaa (FI); Vesa Myllymaki, Vantaa (FI)

(73) Assignee: CARBODEON LTD OY, Vantaa (FI)

( * ) Notice: Subject to any disclaimer, the term of this patent is extended or adjusted under 35 U.S.C. 154(b) by 126 days.

(21) Appl. No.: 14/385,639

(22) PCT Filed: Mar. 16, 2012

(86) PCT No.: PCT/EP2012/054676
§ 371 (c)(1),
(2), (4) Date: Sep. 16, 2014

(87) PCT Pub. No.: WO2013/135305
PCT Pub. Date: Sep. 19, 2013

(65) Prior Publication Data
US 2015/0050207 A1    Feb. 19, 2015

(51) Int. Cl.
*C01B 13/00* (2006.01)
*C01B 31/06* (2006.01)

(52) U.S. Cl.
CPC ........ *C01B 31/065* (2013.01); *C01P 2006/80* (2013.01)

(58) Field of Classification Search
None
See application file for complete search history.

(56) References Cited

U.S. PATENT DOCUMENTS

| | | | | |
|---|---|---|---|---|
| 3,348,918 | A | * 10/1967 | Kruse | C01B 31/06 423/446 |
| 7,585,341 | B2 | 9/2009 | Kumasaka et al. | |
| 2003/0228249 | A1* | 12/2003 | Fujimura | C25D 15/02 423/446 |
| 2006/0011127 | A1 | 1/2006 | Chen et al. | |
| 2011/0232199 | A1 | 9/2011 | Yao | |

FOREIGN PATENT DOCUMENTS

| | | |
|---|---|---|
| DE | 10 2008 028306 A1 | 12/2009 |
| JP | 2007-119650 | 5/2007 |
| RU | 2019502 C2 | 9/1994 |
| RU | 2046094 C1 | 10/1995 |
| RU | 2100389 C1 | 12/1997 |
| RU | 2168462 C2 | 3/2001 |
| RU | 2230702 C1 | 6/2004 |

OTHER PUBLICATIONS

Aleksensky et al, "Deagglomeration of detonation Nanodiamonds" Nanoscience and Nanotechnology Letters (3): pp. 68-74, 2011, vol. 3, No. 1, Feb. 2011, Publisher: American Scientific Publishers, Abstract.

V Yu Dolmatov;, "Detonation-synthesis nanodiamonds: synthesis, structure, properties and applications", Russian Chemical Reviews 76 (4) 339-360 (2007), Russian Academy of Sciences and Turpion Ltd.

International Search Report, dated Feb. 7, 2013, from corresponding PCT application.

* cited by examiner

*Primary Examiner* — Guinever S Gregorio
(74) *Attorney, Agent, or Firm* — Young & Thompson

(57) ABSTRACT

A mild, acid- and alkali-free purification method of detonation nanodiamond material from water-insoluble metal-containing impurities and product obtained thereof. The products thus obtained include nanodiamond and diamond-containing detonation blend. The method is implemented by an impact treatment of the detonation nanodiamond material with aqueous or water organic solutions of chelating agents in concentrations 0.5-20 wt. % at elevated temperature, wherein the weight-percent ratio of the detonation nanodiamond material to an undiluted chelating agent is substantially 1 to 0.2. Impact treatment of the detonation nanodiamond material in chelating agent solution may include boiling, ultrasonication, cavitational disintegration, and harsh treatment in sealed chamber at temperatures of up to about 300° C. and high pressure. The method provides at least 5-fold reduction of metal-containing impurities in the resulting product, wherein the content of such elements as chromium and iron is reduced to negligible amounts.

20 Claims, No Drawings

DETONATION NANODIAMOND MATERIAL PURIFICATION METHOD AND PRODUCT THEREOF

FIELD OF THE INVENTION

The present invention pertains to detonation nanodiamond material purification methods, in particular, to mild methods of purification of said material from water-insoluble metal-containing impurities.

BACKGROUND

Various forms of detonation diamond-containing materials, produced by an explosion of carbon-containing explosive supplies, are known. For example, in order to produce a detonation diamond-containing material, which material may correspond to various mixtures of nanodiamonds and non-diamond forms of carbon, explosives with negative oxygen balance, containing trinitrotoluol, (TNT) and cyclotrimethylenetrinitramine (RDX), are utilized. The products obtainable by detonation synthesis may comprise a diamond-containing detonation blend (DB) and detonation nanodiamonds (DND), wherein the latter may be extracted upon chemical purification of DB from non-diamond carbon and metal-containing impurities.

Diamond-containing detonation blend physically corresponds to a complex mix of nanodiamonds and non-diamond carbon forms, wherein DB particles generally comprise a diamond core of 4-6 nm, surrounded by X-ray amorphous carbon. In accordance with research studies (Dolmatov V. Y., Detonation synthesis ultradispersion diamonds, S-Petersburg, 2003, RU2230702), closest to a diamond core non-diamond carbon corresponds to agglomerated ultrasmall particles of distorted diamond phase nuclei, which particles did transform to diamond because of exhaustion of free carbon. Overall amount of diamond core surrounding non-diamond carbon atoms is in average 50-70% from the overall amount of carbon atoms of DB-particle. Outer boundaries of such a particle correspond to a non-diamond carbon with an uppermost degree of disorder and of a highest reactivity. For this reason outer non-diamond carbon layer of DB particles is so easily oxidized even by weak oxidants.

Detonation nanodiamonds may be in turn extracted from the above mentioned DB by means of DB treatment by aqueous solutions of nitric acid under pressure. In accordance to RU2100389, DND purification process proceeds in liquid phase in two stages, wherein the first stage comprises a treatment of DB by aqueous solutions of 50-99% nitric acid at a temperature range 80-180° C., followed by a second stage DB treatment by aqueous solutions of 10-40% nitric acid at about 250° C. Resulting DND particles comprise a 4-6 nm diamond core, surrounded on its periphery by a very thin layer (about 0.4-0.1 nm) of the most resistant to oxidation non-diamond carbon. Upon producing DND particles from DB, virtually all non-diamond carbon is gasified during the process of chemical purification. Research (Dolmatov V. Y., Detonation Nanodiamonds. Production, properties, application. S-Petersburg-Professional, 2011) has shown, that above mentioned DND particles correspond to complex objects, retaining a three-layer structure, said structure comprises a diamond core of 4-6 nm diameter, comprising 70-90% of overall amount of carbon atoms contained in the particle; a transitional carbon shell surrounding the core, 0.4-0.1 nm thick and comprising non-diamond (X-ray amorphous) carbon, that is most resistant to oxidation and may comprise 30-10% of overall amount of carbon atoms contained in the particle; and a surface layer, comprising carbon atoms and nitrogen, oxygen and hydrogen heteroatoms, included into original explosive composition, which atoms produce various functional groups. However, non-diamond carbon forms neither separate phase nor separate particles. Diamond and non-diamond carbon forms differentiate by electronic states of atoms and chemical reactivity in liquid phase oxidants. High quality DND may comprise 0.4-1.5 wt. % of non-diamond carbon.

Nevertheless, the main problem, preventing effective utilization of DB and DND in various application technologies, is presence of metal-containing impurities therein. Heavy metals, in particular iron, cause detonation nanodiamond particles to agglomerate, increases already existing agglomerates in size and degrades the stability of nanodiamond suspensions (Aleksensky et al, Nanoscience and Nanotechnology Letters (3):68-74, 2011). Although many applications of detonation nanodiamonds in chemistry of polymers, superfinish polishing, in oils and lubricants, electroplating, medicine and biology, require a substantial degree of purification from major disturbing impurities represented by incombustible, water-insoluble metal-containing compounds, the content of metal contaminants in most of the commercially available products is still too high. Those metal-containing impurities most commonly act as undesirable catalysts or inhibitors of key processes, wherein only detonation nanodiamond-containing materials are expected to work. Incombustible impurities are primarily represented by oxides of those metals that compose blasting chamber casing, detonator conducting wires and detonator itself.

Common tryouts for processes of chemical DB purification and DND after-purification are targeted on getting rid of non-diamond carbon and metal-containing impurities at once by utilizing mainly liquid-phase oxidants, that are capable of providing high concentrations of the reagents in reaction zone, and correspondingly, of ensuring high reaction speed (RU2230702; RU2100389; Dolmatov V. Y., Detonation Nanodiamonds. Production, properties, application. S-Petersburg-Professional, 2011). Because liquid-phase oxidation at a reasonable speed occurs at high temperature, oxidative mixtures are being prepared from high-boiling acids, such as $HClO_4$, $H_3PO_4$, $H_2SO_4$ with an addition of active oxidant, such as $HNO_3$, $NaClO_4$, $CrO_3$, $K_2Cr_2O_7$ and the like. Utilization of $HClO_4$, however, is dangerous and expensive. It is of common knowledge (e.g. RU2230702), that chromium trioxide ($CrO_3$) in sulfuric acid is utilized most often in DND production. Purification process thus comprises treatment of DND by boiling sulfuric acid for few hours. The process is simple, but toxic because of presence of large amount of $Cr^{+6}$ both in solution and in extracted DND aggregates. Chromium outflow, resulting from multiple washings of DND from acid and chromium traces, is also hazardous. Utilization of an aqueous solution of nitric acid successfully solves several problems with outflow and waste, however the process is complicated since to be conducted at high temperature (about 230° C.) and pressure (up to 100 atmospheres) and requires special equipment.

Methods for the selective purification of DB from non-diamond carbon and/or metal-containing impurities are also known. Thus, in RU2019502 non-diamond carbon purification of diamond-containing detonation blend is achieved by oxidation of DB by ozone, and in RU2168462—by heating of DB in air atmosphere at 380-440° C. The method of RU2019502 is quite expensive and dangerously explosive, and implementation of method in accordance with RU2168462 is risky because of possible ignition of DB and DND, contained therein. At the same time those methods do not solve the key problem of nanodiamond product's purification from metal-containing impurities; therefore a treatment with harsh oxidative mixtures is still required. Thus, DND purified by the most general 'chromium' method still comprise an essential amount of incombustible water-insoluble metal-containing impurities, including $CrO_3$, $Cr_2O_3$ and other chromium oxides from a number of CrO, $Cr_3O_4$, $CrO_2$, $Cr_5O_{12}$, $Cr_2O_5$, $Cr_6O_{15}$ and $Cr_3O_8$. Impurities, most widely occurring in DB, comprise FeO, $Fe_3O_4$, CuO, $Cu_2O$, ZnO and small amounts of MnO and NiO. Virtually all these compounds are insoluble in water, and are partially removed upon treatment with acids and alkali. At present it is possible to get rid of 10-15% of metal-containing impurities and of 5-7% of a most active non-diamond carbon by treatment of DB by boiling concentrated nitric acid for 3-5 hours, in accordance with RU2046094.

Utilization of DB in chemistry of polymers and as an additive for oils and lubricants requires substantially complete removal of metal-containing impurities while not affecting non-diamond carbon that plays an important role in various processes. Moreover, for the utilization of DND in medicine and biology it is of vital importance to get rid of poisonous chromium, copper and manganese. However, acidic or alkali treatment of certain nanodiamond-containing materials may sometimes not be acceptable for a number of reasons. For example, acidic treatment of DB will reduce an amount of incombustible (mainly metal-containing) impurities 3-4-fold, while the same treatment of previously partly purified DND is will have no effect at all, since DND particles aggregate after such a treatment into hardly destructible objects, and an access of the acid to encapsulated metal oxide particles is very limited. Utilization of aqueous solutions of alkali, such as KOH or NaOH, is dangerous because of DB and DND predisposition to ignite upon alkali treatment thereof at elevated temperatures.

It is therefore desirable to provide an efficient method to produce detonation nanodiamond materials with a substantially high degree of purity in regards to metal containing impurities, such as toxic Cr or agglomeration-inducing Fe, for example, which method may be applied as a post-purification procedure for any commercially available detonation nanodiamond material. It would be further desirable whether said method would be non-aggressive, less toxic and ecologically beneficial.

SUMMARY OF THE INVENTION

The objective of the invention is to at least partly alleviate above mentioned problems by implementing a detonation nanodiamond purification method in accordance with the certain embodiments of the invention.

In particular the objective of the invention is to develop an acid-alkali-free production method for substantially low in metal-containing impurities diamond-containing detonation blend and/or detonation nanodiamonds and to supply a product thereof, by providing conditions for conversion of water-insoluble compounds to water-soluble salts, as well as enabling encapsulated water-insoluble compounds to interact with specifically active complexes upon activation of disintegration of nanodiamond aggregates, while not affecting an active part of non-diamond carbon. Detonation nanodiamonds, purified by said method, may be particularly suitable for medical applications, wherein the absence of chromium is an absolute requirement.

The objective is attained by various embodiments of an acid-alkali free method for purification of a detonation nanodiamond material from water-insoluble incombustible impurities in accordance with the present invention.

In one aspect of the present invention, a method for the purification of detonation nanodiamond material from water-insoluble incombustible impurities is provided, in accordance with the embodiments of the invention, said method comprises obtaining a suspension of the detonation nanodiamond material in a chelating agent solution, an impact treatment of said detonation nanodiamond material in a chelating solution at elevated temperature and extraction of a detonation nanodiamond mass from impact-treated detonation nanodiamond material.

In the preferred embodiment of the invention aforesaid purification method is provided, said method involving utilization of at least one of the listed compounds as a chelating agent and/or the mixture of at least two listed compounds, said compounds are: 2,3-dimercapto-1-propanesulfonic acid sodium, ethylenediaminetetraacetic acid disodium salt dihydrate, thiocarbamide, potassium thiocyanate, dicyandiamide and hexamethylenetetramine. Other chemically and technically suitable chelating agents may be also utilized for the purposes of the method of said embodiment. In accordance to the preferred embodiment, starting detonation nanodiamond material, intended for purification, is dry.

In another substantially additional embodiment aforesaid purification method is provided, wherein an aqueous solution of a chelating agent is utilized.

In another substantially additional embodiment aforesaid purification method is provided, wherein a water-organic solution of a chelating agent is utilized.

In further embodiment aforesaid purification method is provided, said method comprising an impact treatment of the detonation nanodiamond material suspension in a chelating agent by means of boiling said suspension.

In further embodiment aforesaid purification method is provided, said method comprising an impact treatment of the detonation nanodiamond material suspension in a chelating agent by means of propagating ultrasonic wave through said suspension.

In further embodiment aforesaid purification method is provided, said method comprising an impact treatment of the detonation nanodiamond material suspension in a chelating agent by means of applying a cavitational disintegration to said suspension.

In still further embodiment aforesaid purification method is provided, said method comprising an impact treatment of the detonation nanodiamond material suspension in a chelating agent by means of bringing said suspension to a temperature of up to about 300° C. under elevated pressure in a sealed chamber.

In further embodiment aforesaid purification method is provided to enable production of detonation nanodiamonds, substantially purified from water-insoluble incombustible metal-containing impurities. In accordance with the embodiment, a content of water-insoluble incombustible metal containing impurities in the detonation nanodiamond product is reduced about 5-fold in comparison with that in raw detonation nanodiamond material.

In further embodiment aforesaid purification method is provided to enable production of a diamond-containing detonation blend, substantially purified from water-insoluble incombustible metal-containing impurities, said blend corresponding to a mixture of a nanodiamond and non-diamond forms of carbon. In accordance with the embodiment, a content of water-insoluble incombustible metal containing impurities in diamond-containing detonation blend product may be reduced about 5-fold- and a content of non-diamond form of carbon may be reduced about 30-50-fold in comparison with that in raw dry detonation nanodiamond material.

In another aspect of the invention, a detonation nanodiamond-containing product is provided, obtained by the purification method of any abovementioned embodiments.

In some embodiment, a diamond-containing detonation blend product, obtained by the method of aforesaid embodiments, is provided, substantially purified from metal contaminants, in particular from chromium and iron.

In some embodiment, a nanodiamond product, obtained by the method of aforesaid embodiments, is provided, substantially purified from metal contaminants, in particular from chromium and iron.

The term "chelating agent" refers in this disclosure to a substance whose molecules can form several bonds to a single metal ion.

The term "incombustible impurities" refers in this disclosure to metal-containing impurities, primarily represented by oxides of those metals that compose casing of blasting chamber, detonator wiring and detonator, wherein metal particles become trapped or encapsulated into detonation nanodiamond agglomerates during detonation synthesis, which agglomerates are not easily destructed by commonly used impact methods.

The term "dry detonation nanodiamond material" substantially refers in this disclosure to dried, for example, powdered, nanodiamond material, obtained from detonation synthesis and, possibly, purified by harsh acidic methods; or commercially purchased dried nanodiamond material, wherein aforesaid nanodiamond materials comprise metal-containing incombustible impurities and serve as a raw material for the method of the invention.

The term "detonation nanodiamond mass" substantially refers in this disclosure to purified detonation nanodiamond material, extracted from impact-treated raw dry detonation nanodiamond material and comprising diamond-containing detonation blend and the detonation nanodiamond, purified by the method of the invention.

The term "Unithiol" refers in this disclosure to a compound generally known as sodium 2,3-dimercaptopropan sulfonate or DMPS.

The term "Trilon B" refers in this disclosure to a compound generally known as ethylenediaminetetraacetic acid disodium salt dihydrate or EDTA disodium salt.

The term "Urotropin" refers in this disclosure to a compound generally known as hexamethylenetetramine or hexamine.

Abbreviations "DMSO" and "DMFO" refer in this disclosure to compounds generally known as dimethyl sulfoxide and dimethyl formamide, respectively, both are common organic solvents.

All measurements results are given within this disclosure in percentage by weight units (wt %) and refer to the concentration of a particular element in a compound or a particular component in mixture. Measurement results expressed in wt % within this disclosure thus refer to the concentration of the desired material in dry matter, or to the concentration of the desired material per amount of dry matter in solution, dispersion, suspension and the like.

Different embodiments of the present invention will become apparent by consideration of the detailed description, comprising the implementation examples thereof and the accompanying tables.

DETAILED DESCRIPTION OF THE EMBODIMENTS

Various embodiments of the present invention are disclosed herein in more details with the reference to the implementation examples thereof and the accompanying tables. The disclosure is made in a way of example, but not limitation and is not to step out the scope of patent claims.

Dry detonation nanodiamond material for the purification method disclosed may be obtained either commercially or by detonation of carbon-containing explosive with negative oxygen balance (Table 1). It is to be understood, that detonation nanodiamond material, obtained by common methods, often contains metal impurities, in particular, large amount of Cr, resulted from purification thereof by $CrO_3$ in boiling sulfuric acid, (Table 1, DND-III, $CrO_3$). Detonation nanodiamonds, purchased from the market, often contain sufficiently large amounts of iron, which is intolerable in some particular applications.

Purification method of the invention is in particular suitable for purification of dry nanodiamond material, produced beforehand or purchased elsewhere, from metal-containing impurities in the form of metal oxides, for example.

Purification method disclosed herein does not involve utilization of any harsh compounds, such as strong acids and/or alkali, so it will be referred as 'mild'.

Purification method of detonation nanodiamond material from water-insoluble incombustible impurities in accordance with the preferred embodiment of the invention comprises at least the following steps:
- obtaining a suspension of the dry detonation nanodiamond material in a chelating agent solution;
- an impact treatment of said detonation nanodiamond material in a chelating solution at elevated temperature and
- extraction of a detonation nanodiamond mass from impact-treated detonation nanodiamond material.

Raw detonation nanodiamond material is represented by one of the diamond-containing detonation blend and the detonation nanodiamond. In accordance with some embodiment raw material may be dry. Table 1 shows that said raw material, obtained by detonation synthesis, contains substantial amount of metal oxides.

Chelating agents, utilized for said method, are listed in Table 2 and comprise sodium 2,3-dimercaptopropan sulfonate, herein Unithiol, ethylenediaminetetraacetic acid disodium salt dihydrate, herein Trilon B, thiocarbamide, potassium thiocyanate, dicyandiamide and hexamethylenetetramine, herein Urotropin. For those skilled in art it is, however, clear, that any other chelating agent, suitable by its chemical characteristics for the purposes of method disclosed, may be also utilized.

Aforesaid chelating agents may be provided in aqueous or in water-organic solution by utilizing water or water-organic solvents. An optimal concentration of a chelating agent in a solvent is experimentally proven to be in a range of 0.5-20 wt %. If the concentration of a chelating agent is lower than 0.5 wt %, then too much solvent is required, resulting in too low concentration of an active chelating agent and prolonged process. Thus, with a 0.5 wt % chelating agent 2-3 hours of impact treatment is required in order to decrease the concentration of main disturbing elements, such as Cr, Fe, Cu, Zn, Mn. Whether concentration of a chelating agent is 0.2 wt %, same results may be achieved by 20 hours treatment. Hence, process efficiency drops and necessary for purification amount of power increases. Whether concentration of a chelating agent is higher than 20 wt %, the suspension of raw dry detonation nanodiamond material becomes so viscous, that mixing of said suspension during impact treatment is hampered. If that is the case, then in order to reduce an amount of main disturbing metals twofold, the treatment time has to be 4-5-fold, for examples from 2-3 hours to 10-12 hours.

The impact treatment methods, applied to the suspension of dry detonation nanodiamond material in a chelating agent solution, in accordance with embodiments of the invention, may include at least one of the following processes:

Boiling the suspension of detonation nanodiamond material in a chelating agent solution;

Propagating high power ultrasonic wave (1.5 kWt) through the suspension of detonation nanodiamond material in a chelating agent solution;

Cavitational disintegration of the suspension of detonation nanodiamond material in a chelating agent solution;

Bringing up the suspension of detonation nanodiamond material in a chelating agent solution to a temperature of up to about 300° C. under elevated pressure in a sealed chamber.

The method of the invention in accordance with its embodiments will be disclosed further by with regards to the following examples. In all example-related tables the reduction and rise of the elemental metal impurities content after purification are indicated by arrows, pointing downwards and upwards, respectively, the analytical values are given nearby. In appropriate example tables, raw diamond-containing detonation blend DB1 was manufactured by plant "Electrochimpribor", Lesnoy, Russia, with detonation nanodiamond (DND) content 31.66 wt. %; raw DB2 is manufactured by scientific production association "Sinta", Minsk, Belarus, with DND content 64.40 wt. %; and raw DB3 is manufactured by corporation "Diamond Center" S-Petersburg, with DND content 58.03 wt. %

Example 1

Purification method of detonation nanodiamond material from water-insoluble incombustible metal containing impurities while implementing an impact treatment by boiling the suspension of dry detonation nanodiamond material in a chelating agent solution.

The method proceeded as follows: 15 g of powdered chelating agent, herein Unithiol, was dissolved in 300 ml of water while heating up to 40-50° C., thus obtaining a 4.8% solution, therein 15 g of dry detonation nanodiamond material, herein DND, was further introduced. Obtained suspension was mixed to homogeneous state and boiled. During boiling suspension becomes viscous and uniform. After boiling process had continued for 0.5, 1, 1.5 or 3 hours, the suspension was discharged into 700 ml of room temperature deionized water. DND quickly sediment to the bottom of the tank, and clarified solution is of an intensive violet color. After 3-15 hours of sedimentation clarified water layer with no visible traces of DND was discharged into a collection tank in order to minimize material loss. Clean deionized water was poured again into sedimented DND, the suspension was thoroughly mixed and left for 3-15 hours. Clarified water layer was again discharged into a collection tank. The process is thus repeated five or six times until the clarified water layer acquires light-violet color. Afterwards DND residue was boiled in 700 ml of deionized water for about half an hour, DND was let to settle for half an hour, and clarified water was discharged into a tank. Boiling in clean water is then repeated two or three times. Afterwards DND sediment is dried and analyzed for incombustible impurities, oxidizable carbon content, and elemental content.

Results on an implementation of the aforesaid example method using either diamond-containing detonation blend (DB) or the detonation nanodiamonds (DND) as a raw dry detonation nanodiamond material are given in Tables 3-5. Variables, subjected to change in conducted experiments, were chelating agent, ratio of raw dry detonation nanodiamond material to a chelating agent and solvent. In all conducted experiments a stoichiometric excess of a chelating agent to chelated metals was used, because encapsulated metal oxides are hardly accessible by chelating agents and therefore the reaction of complex formation with insoluble compounds is hindered.

In accordance with Tables 3-5, utilization of chelating agents during impact treatment of dry detonation nanodiamond material in solvents have a pronounced effect on the reduction of metal-containing impurities. Thus, elemental content analysis of purified DND in presence of chelating agents shows, that amount of Cr drops 1.4-3-fold, Fe-1.5-7.3-fold, Cu-1.3-3-fold, Zn-1.5-7-fold, Ni-2-5-fold; Ti-2-7-fold, Mn-1.5-4-fold, Na-2-10-fold. Ca, Al and Mg content changes depending on chelating agent utilized, but in average tends to be reduced about twice. Overall amount of incombustible impurities is reduced 1.5-2.5 times, the best result is obtained in exp.6 (Table 3) (2.5-fold reduction, chelating agent dicyandiamide).

Dissolving chelating agents in water-organic solvents, such as aqueous solutions of dimethyl sulfoxide, ethanol or dimethyl formamide (Table 4), does not change an overall pattern of chelating agent's interaction with metal-containing impurities. Thus, Cr amount has been reduced in all experiments and comprised 1.6-3.4-fold, Fe-2,3-9-fold, Cu-3-4-fold. Herein, potassium thiocyanate acted as the best chelating agent, charging in terms of quantity and size of removable metals (exp. 10, Table 4).

The effect of chelating agents on DB-purification (Table 5) proved to be the same as for aforesaid DND purification. An overall amount of metal impurities may thus be reduced 1.5-3.2-fold, the best result (3.2-fold reduction) is attained with (1:1) mixture of potassium thiocyanate and dicyandiamide as chelating agent and concentration of the chelating agent in water equal to about 4.8 wt. % (exp.15, Table 5). Cr content may be reduced 9-fold by utilizing dicyandiamide (exp.17), Fe-1.9-3,3-fold depending on a chelating agent utilized and treatment duration, Mn-1.5-3-fold. Amount of Cu may be reduced 1.5-11 times, wherein the best result was attained in the exp.15. Zn content may be reduced 1.5-156-fold, with the best result attained utilizing thiocarbamide in the exp.14.

Example 2

Purification method of detonation nanodiamond material from water-insoluble incombustible metal containing impurities while implementing an impact treatment by propagating high power ultrasonic wave through the suspension of dry detonation nanodiamond material in a chelating agent solution (ultrasonication).

Aqueous suspension of a dry detonation nanodiamond material, said material comprising DND or DB, in a chelating agent solution was prepared similar to that of Example 1. A ultrasound apparatus probe was placed into a heat-resistant glass bowl containing 300 ml of detonation nanodiamond material suspension. The depth of probe immersion has to be experimented to attain resonant frequency. Ultrasound apparatus is to be adjusted to a maximum power.

Evaporated water may be compensated by pouring in fresh deionized water. Suspension was stirred periodically, while which periods ultrasound was OFF. During ultrasonication process partial destruction of both DND and DB aggregates occurs, and the system DND (or DB)—$H_2O$— Chelating Agent becomes more viscous and difficult to mix. However, in an absence of mechanical stirring an efficiency of detonation nanodiamond material purification decreases. Extractive washing of the ultrasonication impact-treated detonation nanodiamond material from complex metal salts and an excess of a chelating agent was conducted similar to that of Example 1, and so was elemental analysis. Results on an implementation of the aforesaid example method using either detonation nanodiamonds (DND) or diamond-containing detonation blend (DB) as a raw dry detonation nanodiamond material are given in Tables 6 and 7, correspondingly.

In accordance with Table 6, impact treatment of DND suspension in a chelating agent solution by ultrasonication is more advantageous than that by boiling Destruction of DND aggregates provides better access of the chelating agent to otherwise encapsulated metal oxides thus promoting more effective binding and withdrawal of the latter. In addition, DND suspension is heated up during ultrasonication treatment almost to a boiling point, thus resulting in the interaction reaction between chelating agents and metal oxides rate enhancement. Moreover, DND catalytic activity at elevated temperatures is also increased.

It was experimentally proven (Table 6), that utilization of whatsoever chelating agent promotes reduction of Cr content in DND in average 1.5-3.5-fold, however, 3 hour ultrasonication treatment in combination with Unithiol resulted even in 12-fold Cr reduction (exp.21, table 6). Experiment 20 is an exception, wherein a fortiori small amount of a chelating agent complexon (DND:chelating agent ratio=1:0.2) had resulted in negligible effect and in overall had little impact on an amount of incombustible impurities in DND. An amount of such an important element as Fe was also reduced 2.5-5-fold in all experiments; an amount of Mn-reduced 2.1-60-fold in all experiments. In a majority of experiments not traces of Cu were detected upon analysis or amount thereof was reduced 1.5-fold. It turned out to be possible to purify DND from Zn—in experiments 18, 19, 21-23—completely, and in experiments 20 and 24—1,5- and 3-fold, correspondingly; Ni purification had also been successful. The best experimental results achieved so far were about two-fold reduction of the overall amount of incombustible impurities—from 1.42 to 0.61 or 0.80 wt. % (exp. 19, Unithiol; exp. 23, thiocarbamide).

Referring now back to Table 5, wherein experiment 12 shows, that by maintaining weight ratio of dried DB to an undiluted Unithiol (one of the best chelating agents in accordance with experimental results) as 1 to about 0.3, a quite satisfactory result may still be attained, namely an overall amount of incombustible impurities may be reduced about 1.8-fold, while Fe content may be reduced 2.5-fold, Mn-2-fold, Cu-1.5-fold and Zn-1.5-fold. Reduction of aforesaid weight ratio to (1:0.2) for dried DND and undiluted Unithiol led to a very slight decrease in an amount of incombustible impurities amount (about 1.25-fold), wherein the majority of the most important metals, such as Cr, Fe, Ti, Mg, Cu had not shown signs of content change at all (exp.20, table 6). Still, an amount of Zn was reduced 1.5-fold and amount of Mn and Ni—about 3-fold. It is to remember, however, that metal-containing impurities in DB are more accessible to chelation because of weaker interaction between detonation nanodiamond aggregates in diamond-containing detonation blend. Thus, it is advantageous to maintain the ratio between dry detonation nanodiamond material and an undiluted chelating agent at a level no less than 1:0.2.

Table 7 discloses experimental results on ultrasonication treatment of DB suspension in a chelating agent solution. Grand majority of metal impurities in DB are represented by Fe; less pronounced are Cu and Zn. In experiment 25 Fe content was reduced 76-fold, however in whole Fe content decreased 2.5-40-fold. Reduction of Cu amount 1.5-4-fold. Zn content in whole decreased 3-12-fold, however in experiment 25 a 271-fold reduction was registered (chelating agent Unithiol). Amount of Ni was reduced 1.5-3.5-fold, Mn-substantially 3-fold, with an exception of experiment 25, wherein Mn content was reduced 32-fold.

Example 3

Purification method of detonation nanodiamond material from water-insoluble incombustible metal containing impurities while implementing an impact treatment by applying a cavitational disintegration to the suspension of dry detonation nanodiamond material in a chelating agent solution.

The method proceeded as follows: 90 g of powdered chelating agent was dissolved in 900 ml of deionized water at 65° C. Dry detonation nanodiamond material, herein DND, in an amount of 92 g was introduced therein, and the mixture was stirred to obtain a homogenous suspension. The resulted suspension was subjected to a cavitational treatment for 14 min at 65-80° C., whereupon said suspension tends to solidify. After addition of 500 ml of water into suspension another round of cavitational treatment was conducted for 3 min at 60° C. Suspension was divided into two equal parts. One part was subjected to cavitational treatment for 13 min at 70° C., and the second part, in addition to cavitational treatment, was also subjected to ultrasonication (400 Watt, frequency 22 kHz) for 15 min at a temperature ranging from 25 to 75° C. Extractive washing of cavitation impact-treated detonation nanodiamond material from complex metal salts and an excess of a chelating agent was conducted similar to that of an Example 1, and so was elemental analysis.

Extractive washing of the ultrasonication impact-treated detonation nanodiamond material from complex metal salts and an excess of a chelating agent was conducted similar to that of Example 1, and so was elemental analysis. Results on an implementation of the aforesaid example method using either detonation nanodiamonds (DND) or diamond-containing detonation blend (DB) as a raw dry detonation nanodiamond material are given in Tables 8 and 9, correspondingly.

In accordance with data of Table 8, cavitational impact on DND suspension in various chelating agents resulted in 1.5-3-fold reduction of Cr content. The best result (3-fold reduction) was attained with Unithiol in an aqueous solution of DMSO (exp.34). Additional ultrasonic treatment that followed cavitational impact also resulted in 1.5-2-fold reduction of Cr content. Fe content, however, decreased substantially (11-fold) with potassium thiocyanate as a chelating agent (exp.33) even in an absence of ultrasonic treatment. In whole, cavitational treatment of DND suspensions in various chelating agents resulted in 1.5-11-fold decrease of Fe content. The greatest reduction in Ti content (4-fold) was observed in experiment 33 (potassium thiocyanate along with cavitational treatment). Complete removal of Ca from DND was attained in experiments 35 and 36 (Unithiol and Trilon B as chelating agents, correspondingly, along with both cavitational and ultrasonic treatment).

Reduction of Na content in DND was registered to be 3.5-14-fold. Mg content decreased in all experiments 1.6-9-fold. An amount of Mn was reduced in all experiments 1.5-7.5-fold; ultrasonic treatment in this case contributed to better removal thereof. A complete removal of Cu from DND was attained by using Unithiol and Trilon B as chelating agents (exp.31 and 32). In whole, Cu content reduction was 1.5-6-fold. Zn and Ni were removed in all experiments while utilizing cavitational impact on DND suspension with aforementioned chelating agents.

In accordance with data of Table 9, cavitational impact on DB suspension in various resulted in 2-6-fold reduction of Cr content while utilizing diamond-containing detonation blend 2 (exp.41-43). DB1 from different manufacturer originally did not contain any Cr. The best result with Cr was attained in an experiment 43 with Unithiol. An overall amount of incombustible impurities was reduced therein about 4 times. High Fe content in raw DB1 (2.5785 wt. %) was reduced 2-6-fold, the best result obtained with Trilon B in an experiment 39. Raw DB2 had substantially less Fe (0.3994 wt. %), but it was still possible to reduce Fe content 2-3 fold, best result attained with Trilon B (exp.41). The best result on Ti content reduction was observed in experiment 42 (13-fold) with Potassium thiocyanate as chelating agent. Ca content was dramatically reduced in experiments 43 (147-fold) and 41 (10-fold) by utilizing Unithiol and Trilon B as chelating agents, respectively, in water-DMSO solvent. Complete removal of Al was attained in experiment 39 with Trilon B. Complete removal of Na was attained in experiments 41 and 43 with Trilon B and Unithiol, respectively. In whole Na content was reduced 1.5-11-fold. Mg content was reduced 2.4-3-fold in raw DB2. In the majority of experiments the content of Mn decreased 2-12-fold. It was also possible to reduce amount of Cu 1.5-4.5-fold in all experiments with the best result attained with Trilon B in experiment 41. Zn content was in all experiments 1.5-12-fold. Complete purification of DB2 from Ni was attained in exp.43 with Unithiol as chelating agent. In whole, Ni content was reduced 5.5-20-fold.

Charging by data of Tables 8 and 9 it is clear, that no one of the aforementioned chelating agents separately is able to remove all undesirable metal impurities at once. During purification, an impact method and a chelating agent must be chosen dependent on an expected application of product to be purified and whether said application may involve diamond-containing detonation blend, detonation nanodiamonds or both. In whole, an efficiency of cavitational impact on DND and DB suspensions proved to be similar to that of ultrasonic treatment (example 2).

Example 4

Purification method of detonation nanodiamond material from water-insoluble incombustible metal containing impurities while implementing an impact treatment by bringing the suspension of dry detonation nanodiamond material in a chelating agent solution to a temperature of up to about 300° C. under elevated pressure in a sealed chamber.

Aqueous suspension of a dry detonation nanodiamond material, said material comprising DND or DB, in a chelating agent solution was prepared similar to that of Example 1. Aqueous DND or DB suspension (300 ml) in a chelating agent solution was placed into a titanium autoclave (volume 400 ml), provided with thermocouple, bursting disk and pressure sensor. The autoclave was hermetically sealed and placed into a heated melt of Rose's alloy and is connected to the process control and monitoring system. Autoclave is located in a ferroconcrete isolated room and a control panel, all instrument readings are displayed thereon, is located in different room. Required autoclave temperature (for example, 225° C.) and process duration time (for example, 1 h) are set up from the control panel. Upon exposure at 225° C. the pressure may slightly rise in 1 hour, for example, from 25.5 to 29.5 atm. The color of the suspension after an exposure depends on a chelating agent and solvents utilized. After aforesaid impact treatment the suspension is treated similarly to that of Example 1. Results on an implementation of the aforesaid example method using detonation nanodiamonds (DND) and diamond-containing detonation blend (DB) as a raw dry detonation nanodiamond material in aqueous or water-organic solvents are given in Tables 10 and 11, respectively.

From data of Table 10 it is obvious, that amount of incombustible impurities in an raw DND1 decreases 2-3.4-fold, with best results attained with Unithiol in exp.46, and in in raw DND3 the level of impurities decreased 1.5-2-fold, wherein raw DND3 refer to diamond-containing detonation blend (DB) 2, purified by diluted nitric acid at 230° C. and pressure of about 80 atm. In particular, Cr content in DND1 was reduced 2-5-fold with the best result attained in experiment 46 with Unithiol and water-DMSO solvent. In DND3 Cr content decreased 1.9-5-fold with the best result attained with Unithiol in water (exp.47). Fe content in DND1 was reduced 2.4-4.2-fold, the best result attained Unithiol in water (exp.44). Fe content in DND3 was reduced 1.7-14.3-fold, with the best result attained in experiment 49 with Potassium thiocyanate as chelating agent. Ti content was reduced about 1.5-fold, Na-5.6-22-fold, Mg-1.5-7-fold in DND1 and 1.6-3.3-fold in DND3, Mn-1.7-12-fold in DND1, Cu-1.5-3-fold in both DNDs. Zn has been converted to a complex salt and removed completely from both DNDs. The complete removal of Ni was observed from DND1, whereas in DND3 its content was reduced 3-17.6-fold with the best result attained with thiocarbamide.

Table 11 shows the results on aforesaid impact method implementation during purification of diamond-containing detonation blend, wherein DB from different manufactures and, therefore, issuing different amount of detonation nanodiamonds were utilized. Overall reduction of incombustible impurities thus comprised 2-4-fold. Cr content in DB2 was reduced 7.5-15.5-fold, the best result attained with Trilon B in exp.53. Fe content was reduced 2-5.2-fold dependent on DB and chelating agent. The best result was thus attained in exp.51 with Trilon B. Ti content was reduced 2.5-5.4-fold in DB2, Na-3-6-fold in all experiments, Mg-1.5-2.3-fold in DB2, Zn-2.3-11-fold in all experiments, Ni-2.4-3.5-fold in DB2. Amount of Cu was reduced in whole 2-4-fold, with the best result (4-fold reduction) attained in exp.51 with Trilon B.

It is to be noticed, that common row dry DND powder comprises micron size aggregates consisting in turn of submicron size aggregates, the structure of the latter being hierarchic, with the porosity level increasing from core to outer shell. The size of the core thereof is about 200 nm, and said core aggregates are characterized by an essential force. Although it was previously found (Vul et al, Diamond &

Related Materials 20 (2011) 279-284), that it is impossible to destroy core aggregates to primary 4 nm diamond particles by means of traditional ultrasonic treatment of the suspension, an intensive impact on detonation nanodiamond material (DB and DND) suspended in aforementioned chelating agents in aqueous or water-organic solvents complexons resulted in aggregate size substantially less than 200 nm. It was even possible to obtain DND aggregates of 20-30 nm size that substantially facilitated the process of diamond-containing products purification from metal oxides.

The purification method thus disclosed comprises an impact treatment of detonation nanodiamond material in chelating agent solutions and results in high-grade diamond-containing products, namely a diamond-containing detonation blend and a detonation nanodiamond, while employing no hazardous acids and alkali.

TABLE 1

Qualitative and quantitative composition of incombustible impurities in row DB and DND, providing the actual ratio of elements and compounds in said diamond-containing materials.

| | Diamond-containing product | | | |
|---|---|---|---|---|
| | DB | | DND | |
| Product number, Production method | I<br>Explosion of TNT-RDX (50/50%) supply in gaseous medium, 1 kg of explosives per 2 m³ of detonation chamber volume. | II<br>Explosion of TNT-RDX (60/40%) supply in gaseous medium, 1 kg of explosives per 20 m³ of detonation chamber volume. | III<br>DB is obtained similarly to I and purified by boiling of $CrO_3$ solution in concentrated $H_2SO_4$ | IV<br>DB is obtained similarly to I and purified by treatment by 60% $HNO_3$ at 230° C. and pressure 80 atm. |
| Actual overall content of incombustible impurities, wt. % | 5.8 | 3.2 | 1.5 | 0.4 |
| Model mixture of oxides: composition of main impurities. Overall impurities content is 100%; wt. % | | | | |
| $Fe_3O_4$ | 67.5 | 27.0 | 15.0 | 52.0 |
| $CrO_3$ | — | 0.1 | 55.5 | — |
| $SiO_2$ | — | 0.5 | 15.0 | 4.0 |
| CuO | 20.0 | 64.4 | 2.5 | 3.0 |
| ZnO | 12.0 | 2.5 | — | 1.0 |
| $TiO_2$ | — | 1.0 | 8.0 | 37.0 |
| MnO | 0.5 | 1.5 | 2.0 | 0.5 |
| MgO | — | 1.5 | 1.0 | 0.5 |
| NiO | — | 1.5 | 1.0 | 2.0 |

TABLE 2

Chelating agents for treatment of DB and DND.

| Chemical Name | Formula | Solubility in water | Interaction with metals in ionic form |
|---|---|---|---|
| Unithiol, sodium 2,3-dimercaptopropan sulfonate, DMPS | $H_2C$—SH<br>\|<br>$H_2C$—SH<br>\|<br>$H_2C$—$SO_3Na$ | Easily dissolved in water | Cr, Ar, Hg, Bi, Pb |
| Trilon B, ethylenediaminetetraacetic acid disodium salt dihydrate, EDTA disodium salt | $C_{10}H_{14}O_8N_2Na_2 \cdot 2H_2O$ | For 100 ml of water: 11 g at 20° C. 27 g at 90° C. | Cr, Fe, Ti, Al, Cu, Hg, Ca, Mg, Mn, Pb, Ni, Co, Bi, Mo, Ar, Na, Zn |
| Thiocarbamide | $CS(NH_2)_2$ | For 100 ml of water: 15.2 at 22.7° C. 68 g at 60.2° C. | Cr, Zn, Cd, Hg, Pb, Ni, Co |
| Potassium thiocyanate (K thiocyanate) | KCNS | For 100 ml of water: 217 g at 20° C. 408 g at 67° C. | Cr, Fe, Hg, Pb, Ni, Cu, Ti, Zn |
| Dicyandiamide | $(NH_2)_2C=N—C≡N$ | For 100 ml of water: 13 g at 20° C. | Fe, Hg, Pb, Cu, Al, Ni |
| Urotropin, hexamethylene-tetramine, hexamine | $(CH_2)_6N_4$ | For 100 ml of water: 167 g at 20° C. | Fe, Ni, Cu |

TABLE 3

Elemental composition of impurities during DND purification while implementing an impact treatment by boiling the suspension of dry detonation nanodiamond material in chelating agent aqueous solutions (example 1, experiments 1-7).

| Impurities | Raw DND 1 | Exp. 1 Unithiol | Exp. 2 Unithiol | Exp. 3 Trilon B | Exp. 4 Thiocarbamide | Exp. 5 K thiocyanate | Exp. 6 Dicyandiamide | Exp. 7 Urotropin |
|---|---|---|---|---|---|---|---|---|
| *Impurities amount, wt. %* | | | | | | | | |
| Oxidized carbon | 1.93 | 2.14 | 2.07 | 2.26 | 2.31 | 1.76 | 2.01 | 2.2 |
| Incombustible impurities | 1.42 | 0.94 | 0.61 | 0.75 | 0.79 | 0.82 | 0.56 | 0.88 |
| *Elemental composition, wt. %* | | | | | | | | |
| Cr | 0.5557 | 0.3514, ↓ 1.6-fold | 0.1820, ↓ 3.1-fold | 0.2202, ↓ 2.5-fold | 0.3805, ↓ 1.46-fold | 0.4001, ↓ 1.4-fold | 0.2423, ↓ 2.3-fold | 0.3768, ↓ 1.5-fold |
| Si | 0.1924 | 0.1321, ↓ 1.46-fold | 0.1001, ↓ 1.9-fold | 0.1800, not changed. | 0.0304, ↓ 6.3-fold | 0.0100, ↓ 20-fold | 0.0423, ↓ 4.5-fold | 0.0835, ↓ 2.3-fold |
| Fe | 0.1050 | 0.0220, ↓ 4.7-fold | 0.0311, ↓ 3.4-fold | 0.0280, ↓ 3.8-fold | 0.0410, ↓ 1.5-fold | 0.0341, ↓ 3-fold | 0.0223, ↓ 5-fold | 0.0144, ↓ 7.3-fold |
| Ti | 0.0096 | 0.0046, ↓ 2.1-fold | 0.0030, ↓ 3.2-fold | 0.0101, not changed | 0.0033, ↓ 3-fold | 0.0014, ↓ 7-fold | 0.0107, not changed | 0.0111, not changed |
| Ca | 0.0238 | 0.0220, not changed | 0.0071, ↓ 3.4-fold | 0.0309, not changed | 0.0011, ↓ 21-fold | 0.0289, not changed | 0.0266, not changed | 0.0247, not changed |
| S | 0.0021 | 0.0011 ↓ 1.9-fold | 0.0014, ↓ 1.5-fold. | 0.0026, not changed | 0.0006, ↓ 3.5-fold | 0.0027, not changed | 0.0014, ↓ 1.5-fold | 0.0006, ↓ 3.5-fold |
| Al | 0.0335 | 0.0300, not changed | 0.0299, not changed | 0.0037, not changed | 0.0031, ↓ 11-fold | 0.0182, ↓ 1.8-fold | 0.0053, ↓ 6-fold | 0.0380, not changed |
| Na | 0.0156 | 0.0042, ↓ 4-fold | 0.0068, ↓ 2.3-fold | 0.0015, ↓ 10-fold | 0.0173, not changed | 0.0085, ↓ 2-fold | 0.0029, ↓ 5-fold | 0.0039, ↓ 4-fold |
| Mg | 0.0113 | 0.0054, ↓ 2-fold | 0.0114, not changed | 0.0046, ↓ 2.5-fold | 0.0094, not changed | 0.0090, not changed | 0.0078, ↓ 1.5-fold | 0.0055, ↓ 2-fold |
| Mn | 0.0060 | 0.0043, ↓ 1.5-fold | 0.0020, ↓ 3-fold | 0.0031, ↓ 2-fold | 0.0029, ↓ 2-fold | 0.0057, not changed | 0.0041, ↓ 1,5-fold | 0.0016, ↓ 4-fold |
| Cu | 0.0048 | 0.0033, ↓ 1.5-fold | 0.0037, ↓ 1.3-fold | 0.0042, not changed | 0.0040, not changed | 0.0021, ↓ 2-fold | 0.0018, ↓ 3-fold | 0.0029, ↓ 2-fold |
| Zn | 0.0015 | 0.0009, ↓ 1.5-fold | 0.0011, not changed | 0.0008, ↓ 2-fold | 0.0003, ↓ 5-fold | 0.0002, ↓ 7-fold | 0.0004, ↓ 4-fold | 0.0011, not changed |
| Ni | 0.0009 | — | — | 0.0005, ↓ 2-fold | 0.0003, ↓ 3-fold | — | — | 0.0002, ↓ 5-fold |

Exp. 1: weight ratio DND:Unithiol = 1:1, Unithiol concentration 4.8 wt. %, boiling 30 min;
Exp. 2: weight ratio DND:Unithiol = 1:1, Unithiol concentration 4.8 wt. %, boiling 3 h;
Exp. 3: weight ratio DND:Trilon B = 1:0.5, Trilon B concentration 2.4 wt. %, boiling 1.5 h;
Exp. 4: weight ratio DND:Thiocarbamide = 1:1, Thiocarbamide concentration 4.8 wt. %, boiling 3 h;
Exp. 5: weight ratio DND:Potassium thiocyanate = 1:0.8, Potassium thiocyanate concentration 3.8 wt. %, boiling 3 h;
Exp. 6: weight ratio DND:Dicyandiamide = 1:1, Dicyandiamide concentration 4.8 wt. %, boiling 3 h;
Exp. 7: weight ratio DND:Urotropin = 1:1, Urotropin concentration 4.8 wt. %, boiling 3 h.

TABLE 4

Elemental composition of impurities during DND purification while implementing an impact treatment by boiling the suspension of dry detonation nanodiamond material in chelating agent water-organic solutions (Example 1, experiments 8-11).

| Impurities | Raw DND2 | Exp. 8 Unithiol | Exp. 9 Trilon B | Exp. 10 K thiocyanate | Exp. 11 Urotropin |
|---|---|---|---|---|---|
| *Impurities amount, wt. %* | | | | | |
| Oxidized carbon | 1.48 | 1.57 | 1.51 | 1.63 | 1.80 |
| Incombustible impurities | 1.14 | 0.84 | 0.49 | 0.47 | 0.68 |
| *Elemental composition, wt. %* | | | | | |
| Cr | 0.5146 | 0.1514, ↓ 3.4-fold | 0.1880, ↓ 2.7-fold | 0.2328, ↓ 2.2-fold | 0.3160, ↓ 1.6-fold |
| Si | 0.0553 | 0.0122, not changed | 0.0397, not changed | 0.0511, not changed | 0.0499, not changed |
| Fe | 0.0702 | 0.0305, ↓ 2.3-fold | 0.0078, ↓ 9-fold | 0.0086, ↓ 8.2-fold | 0.0218, ↓ 3.2-fold |
| Ti | 0.0087 | 0.0078, not changed | 0.0080, not changed | 0.0037, ↓ 2.4-fold | 0.0088, not changed |
| Ca | 0.0041 | — | 0.0033, not changed | 0.0046, not changed | 0.0047, not changed |
| S | 0.0006 | — | 0.0001, ↓ 6-fold | 0.0012, ↑ 2-fold | 0.0004, ↓ 1.5-fold |
| Al | 0.0065 | 0.0049, not changed | 0.0058, not changed | 0.0041, ↓ 1.5-fold | 0.0038, ↓ 1.5-fold |
| Na | 0.0078 | 0.0019, ↓ 4-fold | 0.0020, ↓ 4-fold | 0.0035, ↓ 2-fold | 0.0044, ↓ 1.5-fold |
| Mg | 0.0008 | 0.0003, ↓ 2-fold | 0.0003, ↓ 3-fold | 0.0010, not changed | 0.0003, ↓ 3-fold |
| Mn | 0.0032 | 0.0021, ↓ 1.5-fold | 0.0003, ↓ 10-fold | 0.0035, not changed | 0.0027, not changed |

TABLE 4-continued

Elemental composition of impurities during DND purification while implementing an impact treatment by boiling the suspension of dry detonation nanodiamond material in chelating agent water-organic solutions (Example 1, experiments 8-11).

| Impurities | Raw DND2 | Exp. 8 Unithiol | Exp. 9 Trilon B | Exp. 10 K thiocyanate | Exp. 11 Urotropin |
|---|---|---|---|---|---|
| Cu | 0.0035 | 0.0041, not changed | 0.0011, ↓ 3-fold | — | 0.0009, ↓ 4-fold |
| Zn | 0.0004 | — | — | — | 0.0005, not changed |
| Ni | 0.0007 | — | 0.0003, ↓ 2-fold | — | — |

Exp. 8: weight ratio DND:Unithiol = 1:0.7 and $H_2O$:DMSO = 1:1 (200 ml:200 ml), Unithiol concentration 2.5 wt. %, boiling 30 min;

Exp. 9: weight ratio DND:Trilon B = 1:1 and $H_2O$:DMSO = 2:1 (200 ml:100 ml), Trilon B concentration 4.5 wt. %, boiling 30 min;

Exp. 10: weight ratio DND:Potassium thiocyanate = 1:1 and $H_2O$:Ethanol = 1:1 (200 MJI:200 MJI), Potassium thiocyanate concentration 4.0 wt. %, boiling 3 h;

Exp. 11: weight ratio DND:Urotropin = 1:0.8 and $H_2O$:DMFA = 2:1 (200 ml:100 ml), Urotropin concentration 3.6 wt. %, boiling 3 h.

TABLE 5

Elemental composition of impurities during DB purification while implementing an impact treatment by boiling the suspension of dry detonation nanodiamond material in chelating agent aqueous and water-organic solutions (Example 1, experiments 12-17).

| Impurities | Raw DB 1 | Exp. 12 Unithiol | Exp. 13 Trilon B | Exp. 14, Thiocarbamide | Exp. 15 K thiocyanate: Dicyandiamide = 1:1 | Exp. 16 Unithiol | Raw DB 2 | Exp. 17 Dicyandiamide |
|---|---|---|---|---|---|---|---|---|
| | | | | Impurities amount wt. % | | | | |
| Oxidized carbon | 63.31 | 65.74 | 64.28 | 64.98 | 63.88 | 66.01 | 32.6 | 34.38 |
| Incombustible impurities | 5.03 | 2.81 | 3.26 | 2.79 | 1.56 | 2.69 | 3.14 | 1.74 |
| | | | | Elemental composition, wt. % | | | | |
| Cr | — | — | — | — | — | — | 0.0155 | 0.0017, ↓ 9-fold |
| Si | 0.0003 | 0.0001, ↓ 3-fold | 0.0005, not changed | 0.0005, not changed | — | 0.0004, not changed | 0.0072 | 0.0091, not changed |
| Fe | 2.5785 | 1.0366, ↓ 2.5-fold | 1.3213, ↓ 2-fold | 1.3881, ↓ 1.9-fold | 0.7863, ↓ 3.3-fold | 1.1641, ↓ 2.2-fold | 0.3994 | 0.2009, ↓ 2-fold |
| Ti | — | — | — | — | — | — | 0.0081 | 0.0033, ↓ 2-fold |
| Ca | — | — | — | — | — | — | 0.0442 | 0.0507, not changed |
| S | 0.0002 | 0.0012 ↑ 6-fold | — | 0.0015 ↑ 7.5-fold | 0.0013 ↑ 6.5-fold | 0.0016 ↑ 8-fold | 0.0010 | — |
| Al | 0.0008 | — | — | 0.0006, not changed | — | 0.0010, not changed | 0.0274 | 0.0252, not changed |
| Na | 0.0153 | 0.0037, ↓ 4.1-fold | 0.0230, ↑ 1.5-fold | 0.0099, ↓ 1.5-fold | 0.0008, ↑ 19-fold | 0.0108, ↓ 1.5-fold | 0.0007 | — |
| Mg | — | — | — | — | — | — | 0.0153 | 0.0069, ↓ 2-fold |
| Mn | 0.0129 | 0.0061, ↓ 2-fold | 0.0037, ↓ 3-fold | 0.0134, not changed | 0.0083, ↓ 1.5-fold | 0.0040, ↓ 1.5-fold | 0.0017 | 0.0004, ↓ 6-fold |
| Cu | 0.9300 | 0.6221, ↓ 1.5-fold | 0.5111, ↓ 1.8-fold | 0.3998, ↓ 2.3-fold | 0.0800, ↓ 11-fold | 0.4778, ↓ 2-fold | 1.8785 | 0.8904, ↓ 2-fold |
| Zn | 0.4064 | 0.2737, ↓ 1.5-fold | 0.1424, ↓ 2.9-fold | 0.0026, ↓ 156-fold | 0.0992, ↓ 4-fold | 0.1919, ↓ 2-fold | 0.0306 | 0.0122, ↓ 2-fold |
| Ni | — | — | — | — | — | — | 0.0348 | 0.0066, ↓ 5-fold |

Exp. 12: weight ratio DB:Unithiol = 1:0.3, $H_2O$, Unithiol concentration 1.6 wt. %, boiling 1.5 h;

Exp. 13: weight ratio DB:Trilon B = 1:0.5 and $H_2O$:DMFA = 2:1 (200 ml:100 ml), Trilon B concentration 2.5 wt. %, boiling 1.5 h;

Exp. 14: weight ratio DB:Thiocarbamide = 1:1, $H_2O$, Thiocarbamide concentration 4.8 wt. %, boiling 1.5 h;

Exp. 15: weight ratio DB:complexon mix = 1:1, $H_2O$, complexon concentration 4.8 wt. %, boiling 1.5 h;

Exp. 16: weight ratio DB:Unithiol = 1:1 and $H_2O$:DMSO = 1:1, Unithiol concentration 3.4 wt. %, boiling 3 h;

Exp. 17: weight ratio DB:Dicyandiamide = 1:1, $H_2O$, Dicyandiamide concentration 4.8 wt. %, boiling 3 h.

TABLE 6

Elemental composition of impurities during DND purification while implementing an impact treatment by propagating high power ultrasonic wave through the suspension of dry detonation nanodiamond material in a chelating agent solution (Example 2, experiments 18-23, 1.5 kWatt).

| Impurities | Raw DND 1 | Exp. 18 Unithiol | Exp. 19 Unithiol | Exp. 20 Unithiol | Exp. 21 Unithiol | Exp. 22 Trilon B | Exp. 23 Thiocarbamide | Exp. 24 Dicyandiamide |
|---|---|---|---|---|---|---|---|---|
| Impurities amount, wt. % | | | | | | | | |
| Oxidized carbon | 1.93 | 2.14 | 1.72 | 2.20 | 1.91 | 2.03 | 2.11 | 2.42 |
| Incombustible impurities | 1.42 | 0.76 | 0.61 | 1.14 | 0.71 | 0.72 | 0.8 | 1.22 |
| Elemental composition, wt. % | | | | | | | | |
| Cr | 0.5557 | 0.2969, ↓ 1.9-fold | 0.1560, ↓ 3.6-fold | 0.5574, not changed | 0.0474, ↓ 12-fold | 0.1548, ↓ 3.6-fold | 0.2986, ↓ ~2-fold | 0.3877, ↓ 1.5-fold |
| Si | 0.1924 | 0.1812, not changed | 0.0800, ↓ 2.4-fold | 0.0115, ↓ 16.7-fold | 0.0266, ↓ ~7-fold | 0.1609, not changed | 0.0037, ↓ 52-fold | 0.0962, ↓ 2-fold |
| Fe | 0.1050 | 0.0464, ↓ 2.3-fold | 0.0311, ↓ 3.5-fold | 0.0889, not changed | 0.0221, ↓ ~5-fold | 0.0233, ↓ 4.5-fold | 0.0603, ↓ 1.5-fold | 0.0394, ↓ 2.5-fold |
| Ti | 0.0096 | 0.0107, not changed | 0.0081, not changed | 0.0114, not changed | 0.0088, not changed | 0.0106, not changed | 0.0093, not changed | 0.0081, not changed |
| Ca | 0.0238 | 0.0262, not changed | 0.0202, not changed | 0.0248, not changed | 0.0040, ↓ 6-fold | 0.0247, not changed | 0.0255, not changed | — |
| S | 0.0021 | 0.0034, ↑ 1.5-fold | 0.0039, ↑ ~2-fold | 0.0059 ↑ 3-fold | 0.0100, ↑ 4.5-fold | 0.0035, ↑ 1.5-fold | 0.0067, ↑ 3-fold | 0.0028, not changed |
| Al | 0.0335 | 0.0303, not changed | 0.0348, not changed | 0.0404, not changed | 0.0095, ↓ ~3-fold | 0.0348, not changed | 0.0366, not changed | 0.0341, not changed |
| Na | 0.0156 | 0.0082, ↓ ~2-fold | 0.0054, ↓ 2.9-fold | 0.0197, not changed | 0.0173, not changed | 0.0202, not changed | 0.0018, ↓ 9-fold | 0.0173, not changed |
| Mg | 0.0113 | 0.0044, ↓ 2.6-fold | 0.0074, ↓ 1.5-fold | 0.0112, not changed | 0.0042, ↓ 2.7-fold | 0.0139, not changed | 0.0053, ↓ 2-fold | 0.0154, not changed |
| Mn | 0.0060 | 0.0013, ↓ 4.6-fold | 0.0008, ↓ 7.5-fold | 0.0018, ↓ 3-fold | 0.0029, ↓ 2.1-fold | 0.0001, ↓ 60-fold | 0.0004, ↓ 15-fold | 0.0032, ↓ 2-fold |
| Cu | 0.0048 | 0.0029, ↓ 1.5-fold | — | 0.0051, not changed | — | 0.0029, ↓ 1.5-fold | 0.0033, ↓ 1.5-fold | 0.0050, not changed |
| Zn | 0.0015 | — | — | 0.0010, ↓ 1.5-fold | — | — | — | 0.0005, ↓ 3-fold |
| Ni | 0.0009 | — | — | 0.0003, ↓ 3-fold | — | — | — | — |

Exp. 18: weight ratio DND:Unithiol = 1:1, H₂O, Unithiol concentration 4.8 wt. %, Ultrasound + periodic 30 sec mixing every 5 min during 30 min;
Exp. 19: weight ratio DND:Unithiol = 1:0.8, H₂O, Unithiol concentration 3.8 wt. %, Ultrasound + periodic 30 sec mixing every 5 min during 1.5 h;
Exp. 20: weight ratio DND:Unithiol = 1:0.2, H₂O, Unithiol concentration 1.0 wt. %, Ultrasound + periodic 30 sec mixing every 5 min during 1.5 h;
Exp. 21: weight ratio DND:Unithiol = 1:1, H₂O, Unithiol concentration 4.8 wt. %, Ultrasound + periodic 30 sec mixing every 5 min during 3 h;
Exp. 22: weight ratio DND:Trilon B = 1:1, H₂O, Trilon B concentration 4.8 wt. %, Ultrasound + periodic 30 sec mixing every 5 min during 3 h;
Exp. 23: weight ratio DND:Thiocarbamide = 1:1, H₂O, Thiocarbamide concentration 4.8 wt. %, Ultrasound + periodic 30 sec mixing every 5 min during 3 h;
Exp. 24: weight ratios DND:Dicyandiamide = 1:0.8 H₂O:DMSO = 1:1 (200 ml + 200 ml), Dicyandiamide concentration 2.8 wt. %, Ultrasound + periodic 30 sec mixing every 5 min during 3 h.

TABLE 7

Elemental composition of impurities during DB purification while implementing an impact treatment by propagating high power ultrasonic wave through the suspension of dry detonation nanodiamond material in chelating agent aqueous and water-organic solutions (Example 2, experiments 25-30, 1.5 kWatt).

| Impurities | Raw DB 1 | Exp. 25 Unithiol | Exp. 26 Trilon B | Exp. 27 Urotropin | Exp. 28 Unithiol | Raw DB 2 | Exp. 29 Unithiol | Exp. 30 K thiocyanate |
|---|---|---|---|---|---|---|---|---|
| Impurities amount, wt. % | | | | | | | | |
| Oxidized carbon | 63.31 | 65.64 | 64.28 | 66.37 | 65.01 | 32.46 | 34.32 | 31.71 |
| Incombustible impurities | 5.03 | 0.78 | 1.23 | 2.62 | 1.71 | 3.14 | 1.13 | 1.48 |
| Elemental composition, wt. % | | | | | | | | |
| Cr | — | — | — | — | — | 0.0155 | 0.0009, ↓ 15-fold | 0.0028, ↓ 5-fold |
| Si | 0.0003 | 0.0005, not changed | — | 0.0005, not changed | 0.0004, not changed | 0.0072 | 0.0081, not changed | 0.0026, ↓ 2.5-fold |
| Fe | 2.5785 | 0.0339, ↓ 76-fold | 0.2247, ↓ ~11-fold | 1.1018, ↓ 2.5-fold | 0.3401, ↓ 8-fold | 0.3994 | 0.0104, ↓ 40-fold | 0.0811, ↓ 5-fold |
| Ti | — | — | — | — | — | 0.0081 | 0.0060, not changed | 0.0088, ↓ 9-fold |

TABLE 7-continued

Elemental composition of impurities during DB purification while implementing an impact treatment by propagating high power ultrasonic wave through the suspension of dry detonation nanodiamond material in chelating agent aqueous and water-organic solutions (Example 2, experiments 25-30, 1.5 kWatt).

| Impurities | Raw DB 1 | Exp. 25 Unithiol | Exp. 26 Trilon B | Exp. 27 Urotropin | Exp. 28 Unithiol | Raw DB 2 | Exp. 29 Unithiol | Exp. 30 K thiocyanate |
|---|---|---|---|---|---|---|---|---|
| Ca | — | — | — | — | — | 0.0442 | — | 0.0539, not changed |
| S | 0.0002 | 0.0018 ↑ 9-fold | — | — | 0.0042, ↑ 21-fold | 0.0010 | 0.0227, ↑ 22-fold | 0.0066, ↑ 6.6-fold |
| Al | 0.0008 | 0.0011, not changed | 0.0006, not changed | 0.0008, not changed | 0.0010, not changed | 0.0274 | 0.0250, not changed | 0.0304, not changed |
| Na | 0.0153 | 0.0018, ↓ 8.5-fold | 0.0055, ↓ 3-fold | 0.0188, not changed | 0.0047, ↓ 3-fold | 0.0007 | — | — |
| Mg | — | — | — | — | — | 0.0153 | 0.0092, ↓ 1.5-fold | 0.0177, not changed |
| Mn | 0.0129 | 0.0004, ↓ 32-fold | 0.0044, ↓ 3-fold | 0.0040, ↓ 3-fold | 0.0101, not changed | 0.0017 | 0.0006, ↓ 3-fold | 0.0019, not changed |
| Cu | 0.9300 | 0.3732, ↓ 2.5-fold | 0.5316, ↓ 2-fold | 0.6087, ↓ 1.5-fold | 0.6428, ↓ 1.5-fold | 1.8785 | 0.4272, ↓ 4-fold | 0.7816, ↓ 2.5-fold |
| Zn | 0.4064 | 0.0015, ↓ 271-fold | 0.0333, ↓ ~12-fold | 0.3222, not changed | 0.0399, ↓ 10-fold | 0.0306 | 0.0026, ↓ 156-fold | 0.0114, ↓ 3-fold |
| Ni | — | — | — | — | — | 0.0348 | 0.0105, ↓ 3.5-fold | 0.0202, ↓ 1.5-fold |

Exp.25: weight ratio DB:Unithiol = 1:0.6, $H_2O$, Unithiol concentration 7.4 wt. %; Ultrasound + periodic 30 sec mixing every 5 min during 3 h;
Exp.26: weight ratio DB:Trilon B = 1:0.6, $H_2O$, Trilon B concentration 7.4 wt. %, Ultrasound + periodic 30 sec mixing every 5 min during 3 h;
Exp.27: weight ratio DB:Urotropin = 1:0.6, $H_2O$, Urotropin concentration 7.4 wt. %, Ultrasound + periodic 30 sec mixing every 5 min during 3 h;
Exp.28: weight ratios DB:Unithiol = 1:0.6 and $H_2O$:DMFA = 1:0.5 (200 ml + 100 ml), Unithiol concentration 7.5 wt. %, Ultrasound + periodic 30 sec mixing every 5 min during 3 h;
Exp.29: weight ratio DB:Unithiol = 1:0.6, $H_2O$, Unithiol concentration 7.4 Macc. %, Ultrasound + periodic 30 sec mixing every 5 min during 3 h;
Exp.30: weight ratios DB:Potassium thiocyanate = 1:0.6 and $H_2O$:DMSO = 1:1 (200 ml + 200 ml), Potassium thiocyanate concentration 5.4 wt. %, Ultrasound + periodic 30 sec mixing every 5 min during 3 h.

TABLE 8

Elemental composition of impurities during DND purification while implementing an impact treatment by applying a cavitational disintegration to the suspension of dry detonation nanodiamond material in a chelating agent solution, and including an additional ultrasound treatment (400 Watt) (Example 3, experiments 31-37).

| Impurities | Raw DND 1 | Exp. 31 Unithiol | Exp. 32 Trilon B | Exp. 33 K thiocyanate | Exp. 34, Unithiol | Exp. 35, Unithiol | Exp. 36 Trilon B | Exp. 37 Dicyandiamide |
|---|---|---|---|---|---|---|---|---|
| Impurities amount, wt. % | | | | | | | | |
| Oxidized carbon | 1.93 | 2.31 | 1.98 | 2.01 | 2.17 | 2.42 | 1.94 | 2.07 |
| Incombustible impurities | 1.42 | 0.79 | 0.67 | 0.99 | 0.84 | 1.02 | 0.93 | 1.08 |
| Elemental composition, wt. % | | | | | | | | |
| Cr | 0.557 | 0.2585, ↓ 2.2-fold | 0.2112, ↓ 2.7-fold | 0.3488, ↓ 1.6-fold | 0.1800, ↓ 3-fold | 0.2794, ↓ 2-fold | 0.2737, ↓ 2-fold | 0.4047, ↓ 1.5-fold |
| Si | 0.1924 | 0.1004, ↓ 2-fold | 0.2027, not changed | 0.1998, not changed | 0.1606, not changed | 0.0762, ↓ 2.5-fold | 0.0119, ↓ ~15-fold | 0.0423, ↓ 4.5-fold |
| Fe | 0.1050 | 0.0530, ↓ 2-fold | 0.0380, ↓ ~3-fold | 0.0083, ↓ 11-fold | 0.0639, ↓ 1.5-fold | 0.0394, ↓ 2.7-fold | 0.0349, ↓ 3-fold | 0.0670, ↓ 1.5-fold |
| Ti | 0.0096 | 0.0038, ↓ 2.5-fold | 0.0056, ↓ 2-fold | 0.0026, ↓ ~4-fold | 0.01271, not changed | 0.0079, not changed | 0.0060, ↓ 1.6-fold | 0.0092, not changed |
| Ca | 0.0238 | 0.0225, not changed | 0.0102, ↓ ~2.5-fold | 0.0313, not changed | 0.0262, not changed | — | — | 0.0285, not changed |
| S | 0.0021 | 0.0092, ↑ 4.4-fold | 0.0028 not changed | 0.0184 ↑ 9-fold | 0.0047, ↑ 2-fold | 0.0122, ↑ 6-fold | 0.0019, not changed | 0.0026, not changed |
| Al | 0.0335 | 0.0240, ↓ ~1.5-fold | 0.0388, not changed | 0.0078, not changed | 0.0289, not changed | 0.0336, not changed | 0.0219, ↓ 1.5-fold | 0.0199, ↓ ~1.5-fold |
| Na | 0.0156 | 0.0151, not changed | 0.0023, ↓ 7-fold | 0.0045, ↓ 3.5-fold | 0.0042, ↓ ~4-fold | 0.0047, ↓ 3-fold | 0.0014, ↓ 11-fold | 0.0011, ↓ 14-fold |
| Mg | 0.0113 | 0.0054, ↓ 2-fold | 0.0072, ↓ 1.6-fold | 0.0065, ↓ 1.7-fold | 0.0054, ↓ 2-fold | 0.0013, ↓ 9-fold | 0.0048, ↓ 2.3-fold | 0.0155, not changed |

TABLE 8-continued

Elemental composition of impurities during DND purification while implementing an impact treatment by applying a cavitational disintegration to the suspension of dry detonation nanodiamond material in a chelating agent solution, and including an additional ultrasound treatment (400 Watt) (Example 3, experiments 31-37).

| Impurities | Raw DND 1 | Exp. 31 Unithiol | Exp. 32 Trilon B | Exp. 33 K thiocyanate | Exp. 34, Unithiol | Exp. 35, Unithiol | Exp. 36 Trilon B | Exp. 37 Dicyandiamide |
|---|---|---|---|---|---|---|---|---|
| Mn | 0.0060 | 0.0010, ↓ 6-fold | 0.0012, ↓ 5-fold | 0.0039, ↓ 1.5-fold | 0.0043, ↓ 1.5-fold | 0.0009, ↓ 6.7-fold | 0.0008, ↓ 7.5-fold | 0.0025, ↓ 2.4-fold |
| Cu | 0.0048 | — | — | 0.0028, ↓ 1.5-fold | 0.0008, ↓ 6-fold | 0.0019, ↓ 2.5-fold | 0.0008, ↓ 6-fold | 0.0015, ↓ 3-fold |
| Zn | 0.0015 | — | — | — | — | — | — | — |
| Ni | 0.009 | — | — | — | — | — | — | — |

Exp. 31: weight ratio DND:Unithiol = 1:1, H₂O, Unithiol concentration 9.1 wt. %, cavitational impact 30 min;

Exp. 32: weight ratio DND:Trilon B = 1:1, H₂O, Trilon B concentration 9.1 wt. %, cavitational impact 30 min;

Exp. 33: weight ratio DND:Potassium thiocyanate = 1:1, H₂O, Potassium thiocyanate concentration 9.1 wt. %, cavitational impact 30 min;

Exp. 34: weight ratio DND:Unithiol = 1:1 and H₂O:DMSO = 2:1 (600 ml + 300 ml), Unithiol concentration 8.8 wt. %, cavitational impact 30 min;

Exp. 35: weight ratio DND:Unithiol = 1:1, H₂O, Unithiol concentration 9.1 wt. % cavitational impact 30 min + Ultrasound 15 min;

Exp. 36: weight ratio DND:Trilon B = 1:1, H₂O, Trilon B concentration 9.1 wt. %, cavitational impact 30 min + Ultrasound 15 min;

Exp. 37: weight ratio DND:Dicyandiamide = 1:1, H₂O, Dicyandiamide concentration 9.1 wt. %, cavitational impact 30 min + Ultrasound 15 min.

TABLE 9

Elemental composition of impurities during DB purification while implementing an impact treatment by applying a cavitational disintegration to the suspension of dry detonation nanodiamond material in a chelating agent solution (Example 3, experiments 38-43).

| Impurities | Raw DB 1 | Exp. 38 Unithiol | Exp. 39 Trilon B | Exp. 40, Urotropin | Raw DB 2 | Exp. 41 Trilon B | Exp. 42 K thiocyanate | Exp. 43 Unithiol |
|---|---|---|---|---|---|---|---|---|
| | | | | Impurities amount, wt. % | | | | |
| Oxidized carbon | 63.31 | 65.66 | 66.55 | 66.37 | 32.46 | 34.01 | 35.55 | 34.94 |
| Incombustible impurities | 5.03 | 2.12 | 1.28 | 2.68 | 3.14 | 0.90 | 1.83 | 0.78 |
| | | | | Elemental composition, wt. % | | | | |
| Cr | — | — | — | — | 0.0155 | 0.0027, ↓ 6-fold | 0.0088, ↓ ~2-fold | 0.0037, ↓ 6-fold |
| Si | 0.0003 | — | — | — | 0.0072 | 0.0069, not changed | 0.0009, ↓ 8-fold. | 0.0028, ↓ 2.5-fold |
| Fe | 2.5785 | 0.8788, ↓ ~3-fold | 0.4303, ↓ ~6-fold | 1.3078, ↓ 2-fold | 0.3994 | 0.1313, ↓ 3-fold | 0.2211, ↓ ~2-fold | 0.0512, ↓ 2.7-fold |
| Ti | — | — | — | — | 0.0081 | 0.0047, ↓ ~1.5-fold | 0.0006, ↓ 13-fold | 0.0093, not changed |
| Ca | — | — | — | — | 0.0442 | 0.0043, ↓ 10-fold | 0.0517, not changed | 0.0003, ↓ 147-fold |
| S | 0.0002 | — | — | 0.0004, not changed | 0.0010 | 0.0013, not changed | 0.0043, ↑ 4.3-fold | 0.0161 ↑ 16-fold |
| Al | 0.0008 | 0.0011, not changed | — | 0.0012, not changed | 0.0274 | 0.0077, ↓ ~3.5-fold | 0.0313, not changed | 0.0259, not changed |
| Na | 0.0153 | 0.0081, ↓ 2-fold | 0.0015, ↓ 10-fold | 0.0101, ↓ 1.5-fold | 0.0007 | — | 0.0011, not changed | — |
| Mg | — | — | — | — | 0.0153 | 0.0049, 3-fold | 0.0186, not changed | 0.0020, ↓ 2.4-fold |
| Mn | 0.0129 | 0.0022, ↓ ~6-fold | 0.0012, ↓ 12-fold | 0.0136, not changed | 0.0017 | 0.0009, ↓ ~2-fold | 0.0006, ↓ 3-fold | 0.0019, not changed |
| Cu | 0.9300 | 0.5818, ↓ 1.7-fold | 0.3411, ↓ ~3-fold | 0.6626, ↓ ~1.5-fold | 1.8785 | 0.3881, ↓ ~4.5-fold | 0.8483, ↓ 2-fold | 0.2507, ↓ 1.5-fold |
| Zn | 0.4064 | 0.2023, ↓ 2-fold | 0.0675, ↓ ~6-fold | 0.1873, ↓ ~2.2-fold | 0.0306 | 0.0026, ↓ ~12-fold | 0.0027, ↓ 11-fold | 0.0202, ↓ 1.5-fold |
| Ni | — | — | — | — | 0.0348 | 0.0017, ↓ 20-fold | 0.0083, ↓ ~5.5-fold | — |

Exp. 38: weight ratio DB:Unithiol = 1:1, H₂O, Unithiol concentration 9.1 wt. %, cavitational impact 30 min;

Exp. 39: weight ratio DB:Trilon B = 1:1, H₂O, Trilon B concentration 9.1 wt. %, cavitational impact 30 min;

Exp. 40: weight ratio DB:Urotropin = 1:1, H₂O, Urotropin concentration 9.1 wt. %, cavitational impact 60 min;

Exp. 41: weight ratio DB:Trilon B = 1:1, H₂O, Trilon B concentration 9.1 wt. %, cavitational impact 30 min;

Exp. 42: weight ratio DB:K thiocyanate = 1:0.8, H₂O, K thiocyanate concentration 7.4 wt. %, cavitational impact 30 min;

Exp. 43: weight ratios DB:Unithiol = 1:0.8 and H₂O:DMSO = 2:1 (600 ml + 300 ml), Unithiol concentration 7.2 wt. %, cavitational impact 30 min

TABLE 10

Elemental composition of impurities during DND purification while implementing an impact treatment by bringing the suspension of dry detonation nanodiamond material in a chelating agent solution to high temperature and pressure in a sealed chamber (Example 4, experiments 44-49).

| Impurities | Raw DND 1 | Exp. 44 Unithiol | Exp. 45 Trilon B | Exp. 46 Unithiol | Raw DND 3 | Exp. 47, Unithiol | Exp. 48 Thiocarbamide | Exp. 49 K thiocyanate |
|---|---|---|---|---|---|---|---|---|
| | | | Impurities amount, wt. % | | | | | |
| Oxidized carbon | 1.93 | 1.48 | 2.27 | 2.18 | 0.89 | 1.18 | 1.33 | 0.80 |
| Incombustible impurities | 1.42 | 0.70 | 0.81 | 0.42 | 0.30 | 0.21 | 0.26 | 0.17 |
| | | | Elemental composition, wt. % | | | | | |
| Cr | 0.5557 | 0.1922, ↓ 2.8-fold | 0.2806, ↓ 2-fold | 0.1171, ↓ ~5-fold | 0.0076 | 0.0015, ↓ 5-fold | 0.0039, ↓ 1.9-fold | 0.0021, ↓ 3.4-fold |
| Si | 0.1924 | 0.0130, ↓ ~15-fold | 0.1285, ↓ 1.5-fold | 0.0279, ↓ 6.2-fold | 0.0041 | 0.0023, ↓ ~1.5-fold | 0.0050, not changed | 0.0017, ↓ 2.4-fold |
| Fe | 0.1050 | 0.0241, ↓ ~4.2-fold | 0.0442, ↓ 2.4-fold | 0.0322, ↓ 3-fold | 0.0772 | 0.0089, ↓ 8.6-fold | 0.0466, ↓ 1.7-fold | 0.0054, ↓ 14.3-fold |
| Ti | 0.0096 | 0.0058, ↓ ~1.5-fold | 0.0107, not changed | 0.0061, ↓ 1.5-fold | 0.0388 | 0.0261, ↓ ~1.5-fold | 0.0423, not changed | 0.0112, ↓ ~3.5-fold |
| Ca | 0.0238 | 0.0071, ↓ 3.4-fold | 0.0020, ↓ 14-fold | 0.0305, not changed | 0.0037 | 0.0034, not changed | 0.0041, not changed | 0.0046, not changed |
| S | 0.0021 | 0.0043, ↑ 2.1-fold | 0.0026, not changed | 0.0106 ↑ 5-fold | — | — | 0.0009, appeared | 0.0012, appeared |
| Al | 0.0335 | 0.0207, ↓ 1.7-fold | 0.0200, not changed | 0.0292, not changed | 0.0061 | 0.0053, not changed | 0.0072, not changed | 0.0060, not changed |
| Na | 0.0156 | 0.0028, ↓ 5.6-fold | 0.0007, ↓ 22-fold | 0.0011, ↓ 15-fold | — | — | — | — |
| Mg | 0.0113 | 0.0016, ↓ 7-fold | 0.0074, ↓ ~1.5-fold | 0.0042, ↓ 2.7-fold | 0.0047 | 0.0018, ↓ 3-fold | 0.0028, ↓ 1.6-fold | 0.0014, ↓ 3.3-fold |
| Mn | 0.0060 | 0.0035, ↓ 1.7-fold | 0.0014, ↓ 5-fold | 0.0005, ↓ 12-fold | — | — | — | — |
| Cu | 0.0048 | 0.0033, ↓ 1.5-fold | 0.0030, ↓ 1.5-fold | 0.0015, ↓ 3-fold | 0.0055 | 0.0038, ↓ 1.5-fold | 0.0063, not changed | 0.0017, ↓ 3.2-fold |
| Zn | 0.0015 | — | — | — | 0.0009 | — | — | — |
| Ni | 0.0009 | — | — | — | 0.0088 | 0.0029, ↓ 3-fold | 0.0005, ↓ 17.6-fold | 0.0016, ↓ 5.5-fold |

Exp. 44: weight ratio DND:Unithiol = 2:1, $H_2O$, Unithiol concentration 2.4 wt. %, autoclave, 225° C., 1 h;
Exp. 45: weight ratio DND:Trilon B = 1:0.5, $H_2O$, Trilon B concentration 2.4 wt. %, autoclave, 225° C., 1 h;
Exp. 46: weight ratios DND:Unithiol = 1:1 and $H_2O$:DMSO = 1:0.5 (200 ml + 100 ml), Unithiol concentration 2.4 wt. %, autoclave 225° C., 1 h;
Exp. 47: weight ratio DND:Unithiol = 2:1, $H_2O$, Unithiol concentration 2.4 wt. %, autoclave, 225° C., 1 h;
Exp. 48: weight ratio DND:Thiocarbamide = 1:0.5, $H_2O$, Thiocarbamide concentration 2.4 wt. %, autoclave, 225° C., 1 h;
Exp. 49: weight ratio DND:Potassium thiocyanate = 1:0.5, $H_2O$, Potassium thiocyanate concentration 2.4 wt. %, autoclave, 225° C., 1 h.

TABLE 11

Elemental composition of impurities during DB purification while implementing an impact treatment by bringing the suspension of dry detonation nanodiamond material in a chelating agent solution to high temperature and pressure in a sealed (Example 4, experiments 50-54)

| Impurities | Raw DB 1 | Exp. 50 Unithiol | Exp. 51 Trilon B | Raw DB 2 | Exp. 52, K thiocyanate | Exp. 53, Trilon B | Raw DB 3 | Exp. 54, Dicyandiamide |
|---|---|---|---|---|---|---|---|---|
| | | | Impurities amount, wt. % | | | | | |
| Oxidized carbon | 63.31 | 66.50 | 67.32 | 32.46 | 34.20 | 34.42 | 38.51 | 40.96 |
| Incombustible impurities | 5.03 | 1.84 | 1.32 | 3.14 | 1.40 | 1.18 | 3.46 | 1.01 |
| | | | Elemental composition, wt. % | | | | | |
| Cr | — | — | — | 0.0155 | 0.0022, ↓ ~7.5-fold | 0.0010, ↓ 15.5-fold | — | — |
| Si | 0.0003 | — | — | 0.0072 | 0.0080, not changed | 0.0032, ↓ ~2.6-fold | 0.0054 | 0.0060, not changed |
| Fe | 2.5785 | 0.7289, ↓ 3.6-fold | 0.4900, ↓ 5.2-fold | 0.3994 | 0.1119, ↓ ~4-fold | 0.2002, ↓ 2-fold | 0.9009 | 0.2660, ↓ ~3.4-fold |
| Ti | — | — | — | 0.0081 | 0.0032, ↓ ~2.5-fold | 0.0013, ↓ 5.4-fold | — | — |
| Ca | — | — | — | 0.0442 | 0.0529, not changed | 0.0076, ↓ ~5.8-fold | | |

TABLE 11-continued

Elemental composition of impurities during DB purification while implementing an impact treatment by bringing the suspension of dry detonation nanodiamond material in a chelating agent solution to high temperature and pressure in a sealed (Example 4, experiments 50-54)

| Impurities | Raw DB 1 | Exp. 50 Unithiol | Exp. 51 Trilon B | Raw DB 2 | Exp. 52, K thiocyanate | Exp. 53, Trilon B | Raw DB 3 | Exp. 54, Dicyandiamide |
|---|---|---|---|---|---|---|---|---|
| S | 0.0002 | 0.0026, ↑ 13-fold | — | 0.0010 | 0.0073, ↑ 7-fold | — | 0.0082 | 0.0032 ↓ ~2.6-fold |
| Al | 0.0008 | 0.0010, not changed | 0.0002, ↓ 4-fold | 0.0274 | 0.0303, not changed | 0.0188, ↓ ~1.5-fold | 0.0338 | 0.0089, ↓ ~4-fold |
| Na | 0.0153 | 0.0027, ↓ 5.7-fold | 0.0048, ↓ 3-fold | 0.0007 | — | — | 0.0222 | 0.0037, ↓ 6-fold |
| Mg | — | — | — | 0.0153 | 0.0106, ↓ 1.5-fold | 0.0066, ↓ 2.3-fold | — | — |
| Mn | 0.0129 | 0.0098, not changed | 0.0047, ↓ ~3-fold | 0.0017 | 0.0009, ↓ 2-fold | — | 0.0043 | 0.0038, not changed |
| Cu | 0.9300 | 0.4049, ↓ ~2-fold | 0.2323, ↓ 4-fold | 1.8785 | 0.6778, ↓ 2-fold | 0.5300, ↓ ~3.5-fold | 1.3230 | 0.3602, ↓ ~3.7-fold |
| Zn | 0.4064 | 0.1780, ↓ 2.3-fold | 0.0999, ↓ 4-fold | 0.0306 | 0.0027, ↓ 11-fold | 0.0049, ↓ ~6-fold | 0.0498 | 0.0200, ↓ 2.5-fold |
| Ni | — | — | — | 0.0348 | 0.0140, ↓ 2.4-fold | 0.0039, ↓ 3.5-fold | — | — |

Exp. 50: weight ratio DB:Unithiol = 1:0.5, H$_2$O, Unithiol concentration 2.4 wt. %, autoclave 225° C., 1 h;
Exp. 51: weight ratio DB:Trilon B = 1:0.5, H$_2$O, Trilon B concentration 2.4 wt. %, autoclave 225° C., 1 h;
Exp. 52: weight ratio DB:Potassium thiocyanate = 1:0.5, H$_2$O, Potassium thiocyanate concentration 2.4 wt. %, autoclave, 225° C., 1 h;
Exp. 53: weight ratios DB:Trilon B = 1:0.8 and H$_2$O:DMFA = 2:1 (200 ml + 100 ml), Trilon B concentration 3.9 wt. %, autoclave 225° C., 1 h;
Exp. 54: weight ratio DB:Dicyandiamide = 1:1, H$_2$O, Dicyandiamide concentration 4.8 wt. %, autoclave, 210° C., 30 min

The invention claimed is:

1. A method for purification of a diamond-containing detonation blend from water-insoluble incombustible metal-containing impurities present in a raw detonation nanodiamond material, the method comprises:
   obtaining a suspension of the raw detonation nanodiamond material in a chelating agent solution;
   impact treatment of said suspension in the chelating agent solution at an elevated temperature; and
   extraction of the diamond-containing detonation blend from the impact-treated suspension, wherein
   the entire method proceeds in an absence of acids and/or alkali, and
   wherein said diamond-containing detonation blend is a mixture of diamond nanoparticles and non-diamond carbon.

2. The method of claim 1, wherein the chelating agent solution is aqueous.

3. The method of claim 1, wherein the chelating agent solution is water-organic.

4. The method of claim 1, wherein the concentration of the chelating agent in solution is in a range of 0.5-20 wt. %.

5. The method of claim 1, wherein the chelating agent is selected from the group consisting of:
   2,3-dimercapto-1-propanesulfonic acid sodium,
   ethylenediaminetetraacetic acid disodium salt dihydrate,
   thiocarbamide,
   potassium thiocyanate,
   dicyandiamide,
   hexamethylenetetramine and
a mixture of at least two compounds thereof.

6. The method of claim 1, wherein raw the detonation nanodiamond material is provided in respect to an undiluted chelating agent in a ratio of 1 to 0.2.

7. The method of claim 1, wherein the impact treatment of the raw detonation nanodiamond material suspension in a chelating agent comprises boiling said suspension.

8. The method of claim 1, wherein the impact treatment of the raw detonation nanodiamond material suspension in a chelating agent comprises propagating ultrasonic wave through said suspension.

9. The method of claim 1, wherein the impact treatment of the suspension of the raw detonation nanodiamond material in a chelating agent comprises applying a cavitational disintegration to said suspension.

10. The method of claim 1, wherein the impact treatment of the suspension of the raw detonation nanodiamond material in a chelating agent comprises bringing said suspension to a temperature of up to about 300° C. under elevated pressure in a sealed chamber.

11. The method of claim 1, wherein a content of water-insoluble incombustible metal containing impurities in the diamond-containing detonation blend product is reduced by about 70-85% in comparison with that in the raw detonation nanodiamond material.

12. The method of claim 1, wherein the diamond-containing detonation blend extracted from the impact-treated suspension further comprises a detonation nanodiamond having a content of water-insoluble incombustible metal-containing impurities reduced by about 60-70% in comparison with that in raw detonation nanodiamond material.

13. The method of claim 1, wherein the content of chromium VI in the diamond-containing detonation blend, is less than or equal to 0.01 wt %.

14. The method of claim 1, wherein the content of iron in the diamond-containing detonation blend is less than or equal to 0.2 wt %.

15. The method of claim 1, wherein the content of water-insoluble incombustible metal containing impurities in the diamond-containing detonation blend is less than or equal to 1.5 wt %.

16. The method of claim 1, wherein non-diamond carbon constitutes 50-70% of overall carbon content within the diamond-containing detonation blend.

17. A method for purification of a diamond-containing detonation blend from water-insoluble incombustible metal-containing impurities present in a raw detonation nanodiamond material, the method comprises:
   obtaining a suspension of the raw detonation nanodiamond material in a chelating agent solution;

impact treatment of said suspension in the chelating agent solution at an elevated temperature; and extraction of the diamond-containing detonation blend from the impact-treated suspension, wherein the entire method proceeds in an absence of acids and/or alkali, and wherein said diamond-containing detonation blend is a mixture of nanoparticles composed of a diamond core surrounded by non-diamond carbon.

18. The method of claim 17, wherein the chelating agent solution is aqueous.

19. The method of claim 17, wherein the chelating agent solution is water-organic.

20. The method of claim 17, wherein the concentration of the chelating agent in solution is in a range of 0.5-20 wt. %.

* * * * *